(12) United States Patent
Beneker

(10) Patent No.: US 8,955,813 B2
(45) Date of Patent: Feb. 17, 2015

(54) LOCKING UNIT OF A LONGITUDINAL ADJUSTMENT DEVICE OF A MOTOR VEHICLE SEAT, COMPRISING CATCH PINS

(75) Inventor: Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 13/882,025

(22) PCT Filed: Oct. 18, 2011

(86) PCT No.: PCT/EP2011/068146
§ 371 (c)(1),
(2), (4) Date: Jul. 12, 2013

(87) PCT Pub. No.: WO2012/055721
PCT Pub. Date: May 3, 2012

(65) Prior Publication Data
US 2013/0299664 A1 Nov. 14, 2013

(30) Foreign Application Priority Data
Oct. 27, 2010 (DE) .......................... 10 2010 043 025

(51) Int. Cl.
*G05G 5/06* (2006.01)
*B60N 2/08* (2006.01)

(52) U.S. Cl.
CPC ............ *B60N 2/0806* (2013.01); *B60N 2/0818* (2013.01); *B60N 2/0875* (2013.01)
USPC ........... 248/429; 248/430; 74/527; 296/65.13

(58) Field of Classification Search
CPC ... B60N 2/0806; B60N 2/0818; B60N 2/0815
USPC .................... 248/423, 424, 429, 430; 74/527; 296/65.13; 297/344.11
See application file for complete search history.

(56) References Cited

U.S. PATENT DOCUMENTS 5,560,262 A * 10/1996 Orzech ........................... 74/527
5,564,315 A * 10/1996 Schuler et al. .................. 74/527
(Continued)

FOREIGN PATENT DOCUMENTS

| DE | 27 29 770 | 1/1979 |
| DE | 197 09 149 A1 | 9/1998 |
| DE | 102 42 825 A1 | 6/2003 |

OTHER PUBLICATIONS

International Search Report received in connection with international application No. PCT/EP2011/068146; dtd Dec. 29, 2011.

*Primary Examiner* — Anita M King
(74) *Attorney, Agent, or Firm* — Foley & Lardner LLP

(57) ABSTRACT

A locking unit of a longitudinal adjustment device of a motor vehicle seat includes a latching strip, which has detent openings and detent ridges, and b) a catch unit, which includes at least two catch pins, each catch pin having a front region, a tapering region, and a shaft region. The tapering region tapers from an upper point B to a lower point A. The tapering region is delimited by a line which connects the points A and B and which does not have a rectilinear progression. The line is not located outside of a straight line connecting points A and B, and is located within the straight line over at least one third of the distance AB.

7 Claims, 3 Drawing Sheets

(56) References Cited

U.S. PATENT DOCUMENTS

| | | |
|---|---|---|
| 5,913,947 A | 6/1999 | Groche |
| 6,308,589 B1 * | 10/2001 | Schuler et al. .................. 74/538 |
| 6,764,054 B2 * | 7/2004 | Becker et al. ................. 248/429 |
| 7,207,541 B2 * | 4/2007 | Frohnhaus et al. ........... 248/429 |
| 7,905,461 B2 * | 3/2011 | Noffz ............................ 248/429 |
| 7,931,246 B2 * | 4/2011 | Brewer et al. ................. 248/429 |
| 7,980,525 B2 * | 7/2011 | Kostin .......................... 248/429 |
| 8,550,420 B2 * | 10/2013 | Wojatzki et al. ............. 248/429 |

* cited by examiner

LOCKING UNIT OF A LONGITUDINAL ADJUSTMENT DEVICE OF A MOTOR VEHICLE SEAT, COMPRISING CATCH PINS

CROSS REFERENCE TO RELATED APPLICATIONS

The present application is a National Stage of International Application No. PCT/EP2011/068146 filed on Oct. 18, 2011, which claims the benefit of German Patent Application No. 10 2010 043 025.0 filed on Oct. 27, 2010, the entire disclosures of which are incorporated herein by reference.

The invention relates to a locking device of a longitudinal adjustment device of a motor vehicle seat, comprising a) a latching strip that comprises periodically disposed latching openings and latching webs and is allocated to a floor rail of the longitudinal adjustment device, and b) a blocking unit that is allocated to a seat rail of the longitudinal adjustment device and comprises at least two blocking pins, which can be latched into latching openings independently of one another and unlatched together, and which each have a front region with a front end, a tapering region following the front end and cooperating with the latching webs, and a shaft region that follows the tapering region and has an upper end, wherein the tapering region, seen in profile, tapers from an upper point B to a lower point A, and which have a pin axis.

BACKGROUND

Such a locking device is known from DE 10242825 A1. With regard to the prior art, further reference is also made to DE 197 09 149 A1 and DE 27 29 770 C2. Such locking devices are also referred to as multi-pin locking devices. They make a secure latching and a fine-stepped longitudinal adjustment possible. In the blocked position, two blocking pins rest against one latching web adjacent to them, respectively. With their tapering region, the blocking pins rests against the latching web. The tapering region is formed as a frusto-conical region; it is situated between the front region and the shaft region of the blocking pins. A blocking pin blocks in only one displacement direction, respectively. The two blocking pins block in different displacement directions. The angle at which the tapering region rests against the latching web lies in the range of a self-locking action.

Since only one blocking pin is generally responsible for locking a displacement direction, during an exposure to a load, the entire locking forces act upon this one blocking pin and the corresponding latching web against which the blocking pin rests. Due to the load, the blocking pin positions itself slightly obliquely within its guide in the blocking unit, which leads to an increase of the angle at which the tapering region rests against the latching web. In the case of a repeated load, i.e. when driving over several road bumps or in case of pressure on a backrest of the motor vehicle seat, the blocking pin responsible for locking is more or less pushed out, i.e. pushed upwards in the z direction, from the latching opening which it has engaged. This is a disadvantage. Though this pushing-out does not lead to a complete release of the lock because at least one further blocking pin is in engagement with a latching opening and because other blocking pins can latch in subsequently, it does lead to a certain readjustment of the vehicle seat in the longitudinal direction. This effect can repeat itself several times.

It is disadvantageous if a blocking pin is pushed out of the locking mechanism. The forces that put an upwardly directed load on the blocking pin should be as small as possible. It has to be prevented that the blocking pin is released from the associated latching web.

BRIEF SUMMARY

This is where the invention comes in. It has set itself the object of further developing the locking device of the type mentioned in the introduction in such a way that the danger of a blocking pin being pushed up automatically and unimpededly is reduced, and that it is prevented, in particular, that a blocking pin can be inadvertently released from a latching opening.

This object is achieved by a locking device with the features of claim 1.

In this locking device, the tapering region no longer extends in a conical shape. Instead of the rectilinear profile between the points A and B according to the prior art, the blocking pin now has a tapering region which is described by the line AB that extends in a non-rectilinear way. This line never lies outside the line segment AB. At least over a partial section, it lies within this line segment. The angle at which the tapering region rests against a latching web is now no longer constant. It is dependent upon the position of the blocking pin relative to the latching web. Close to the point A, the angle is smaller than in the prior art. The closer the resting contact comes to the point B along the line AB, the larger the angle between the tapering region and the latching web gets. Close to the point B, the angle reaches values that are larger than in the case of a rectilinear profile in accordance with the prior art.

This solution offers the following advantage: The more a blocking pin is moved out of a latching opening, the smaller the angle gets at which the tapering region rests against the latching web. Thus, the smaller the force component becomes which can push the blocking pin in the z direction out of the latching opening. On the whole, an undesired release of the latching pin from a latching opening is prevented significantly better than is the case in the prior art.

The invention maintains the distance between the points A and B, projected onto the longitudinal direction of the rails. Thus, the region available for play compensation is maintained.

Close to the point A, and particularly in the lower third of the line segment AB, the angle at which the tapering region rests against the latching web is supposed to definitely be less than the angle of self-locking action of the materials used. For example, the angle is less than 6°, preferably less than 5°. In relation to the angle between the line AB and the pin axis, this means an even smaller angle, for example of less than 4.5°. Under load, the pin axis positions itself at an angle of about 0.5° relative to the latching openings. The latching openings are at right angles to the latching strip.

The line AB can be composed of at least two sections, preferably several sections. It can be, for example, a polygon curve consisting of two, three or several rectilinear sections. It can also be composed, piece by piece, of non-rectilinear sections. Mixed forms having at least one rectilinear section and at least once curved section are also possible. If the line AB is composed of sections, it is continuous, but not continuously differentiable.

Advantageously, the line AB extends in a continuously differentiable way between the points A and B. In this case, it is formed from a connected curve.

Preferably, the gradient of the line AB, starting from the point A, continuously decreases towards the point B. The line AB behaves monotonically. It has no inflection point. Preferably, the line AB is formed by a part of an arc of a circle, of an ellipse, of a parabola or the like.

The tapering region provides for the locking mechanism to be free from play. In each case, the blocking pins plunge so deeply into a latching opening until a play-free lock is achieved by means of two blocking pins.

A front region is substantially caused and/or necessary due to the manufacturing process of the blocking pin by way of cold forming or the like. It has proved to be very advantageous that the front region comprises a cylindrical portion. The latter has a length of, for example, 0.5 mm to 2 mm, measured in the direction of the pin axis. The cylindrical portion in the end prevents the blocking pin from being freed completely from a latching web.

The applicant reserves the right to combine any features and sub-features from sentences of the description and/or any features and/or sub-features from claims, particularly from the sub-claims, and also partial features, with one another in any form.

Preferably, the blocking pin is rotationally symmetric about the pin axis at least in the tapering region. Preferably, it is rotationally symmetric as a whole.

The shaft region is irrelevant for the description of the invention. It can be configured in accordance with the prior art. Usually, means are provided in the shaft region, such as e.g. a collar, in order to have a point of application for a lid. Preferably, a furrowed region is also located in the shaft region; reference is made in this regard to the disclosure of DE 102 42 825 A1.

Other advantages and features of the invention become apparent from the other claims as well as from the following description of exemplary embodiments of the invention, which are to be understood not to be limiting and which will be explained below. In the drawing:

DETAILED DESCRIPTION

Figure 1:
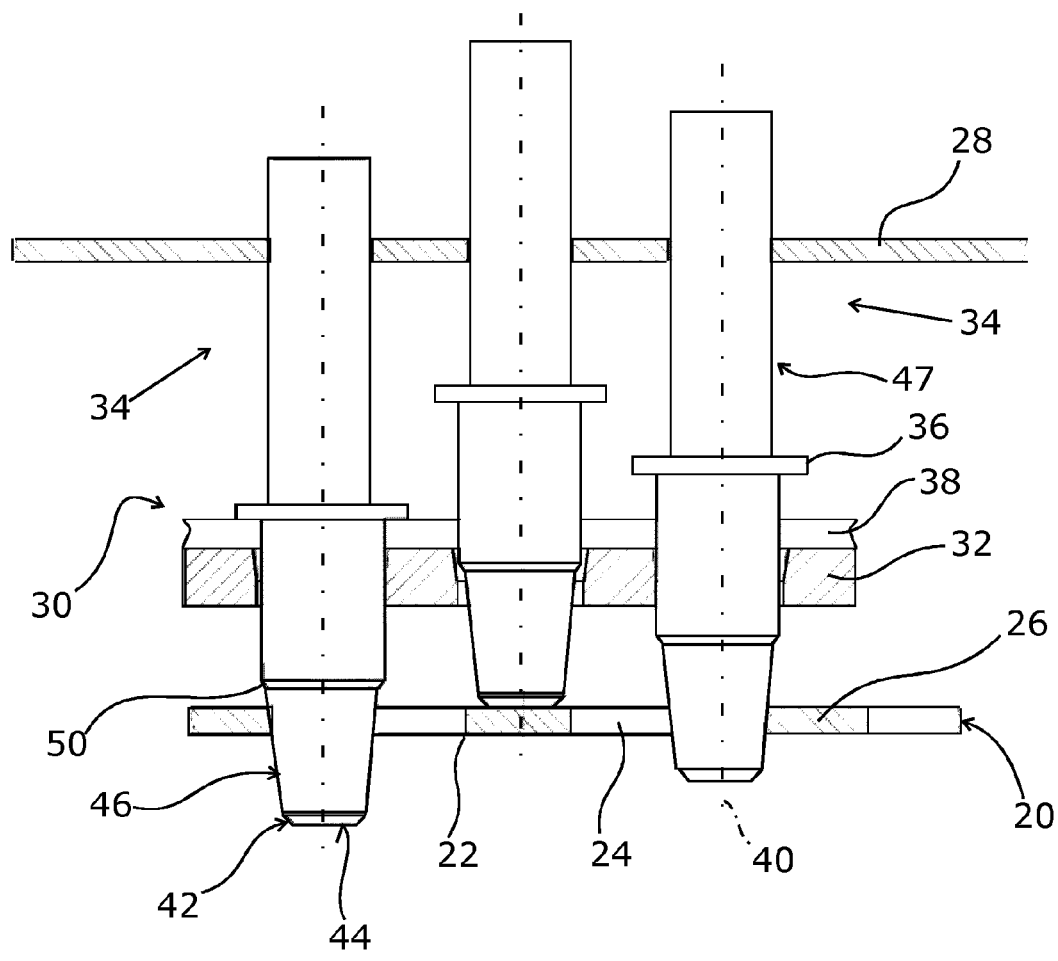
FIG. 1: shows a sectional illustration of a locking device according to the prior art, the sectional plane being in the x-z-plane.

The locking device according to FIG. 1 for a longitudinal adjustment means of a motor vehicle seat has a floor rail 20 forming a latching strip 22. The latter comprises periodically disposed latching openings 24; one latching web 26 is located between two latching openings 24, respectively. The longitudinal adjustment device moreover comprises a seat rail 28 to which a blocking unit 30 is connected. The blocking unit 30 comprises a pin guide 32. Furthermore, it comprises three blocking pins 34 that are constructionally identical. They protrude through guide bores in the pin guide 32. The two outer blocking pins 34 rest against one adjacent latching web 26, respectively, of the latching strip 22; the resting contact is free from play. The central blocking pin 34 is inactive; it rests on a latching web 26. Each blocking pin 34 is allocated a spring (not shown) which biases it in the position shown. The spring moves its respective blocking pin 34 downwards. The blocking pins 34 comprise a collar 36; the collar 36 forms the region of the largest diameter of the blocking pin 34. A lid 38 is situated underneath the collars 36 of the three blocking pins 34. It serves for unlocking all three blocking pins 34 of the blocking unit 30 together.

As can be seen from FIG. 1, the left-hand blocking pin 34 rests on the lid 38. The lid 38 rests on the pin guide 32. Therefore, it is not possible for the left-hand blocking pin 34 to plunge further into the latching opening 24. The left-hand blocking pin 34 is at its lowermost position.

A right-handed, perpendicular coordinate system with the axes x, y and z is used for the description. The z axis extends parallel to a pin axis 40. The x direction extends in the longitudinal direction of the two rails 20, 28, and thus parallel to the displacement direction of the longitudinal adjustment device. The y axis extends perpendicular to the paper plane in FIG. 1.

The blocking pins 34 each have a front region 42 having a front end 44. In an upward direction, a tapering region 46 follows the front region 42. This is in turn followed by a shaft region 47. All of the Figures show a side or profile view of the blocking pin 34. The profile of the tapering region 46 has an upper point B and a lower point A. The point B in a blocking pin 34 lies on a circular line, as does the point A. These circular lines are concentric and central to the pin axis 40.

Figure 2:
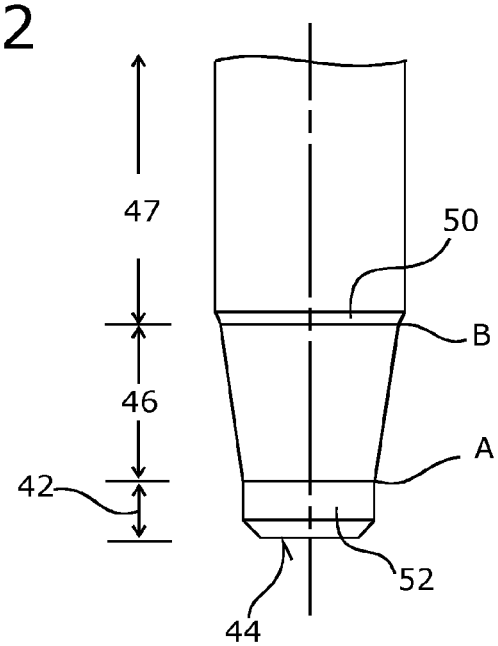
FIG. 2: shows a view with a viewing direction as in FIG. 1 onto a lower section of a blocking pin according to the prior art and similar to FIG. 1, but with a cylindrical portion.

In the embodiment according to FIG. 2, the blocking pin 34 has a cylindrical portion 52. This is a part of the front region 42. The cylindrical portion 52 preferably has an axial length of 10 to 30%, preferably of about 25% of the axial length of the tapering region 46.

Figure 3:
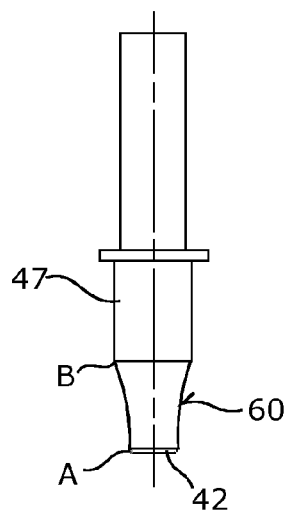
FIG. 3: shows a side view of a blocking pin according to the teaching of patent claim 1.
Figure 4:
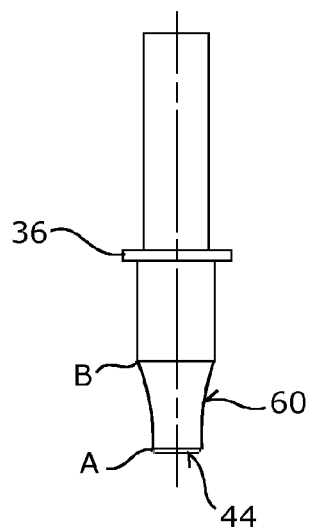
FIG. 4: shows a side view, as in FIG. 3, for a second embodiment of a blocking pin according to the teaching of claim 1.
Figure 5:
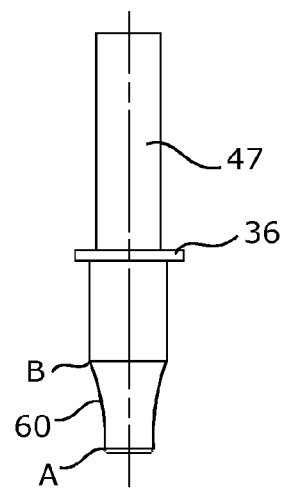
FIG. 5: shows an illustration like FIG. 3 of a third embodiment of the blocking pin according to the teaching of claim 1.

In the blocking pin 34 according to the prior art, the points A and B are connected to one another by a straight line 48. In the blocking pin 34 having the features of claim 1, the boundary of the tapering region 46 is never outside this straight line 48, but at least partially within it, preferably completely within it. The points A and B are connected to one another by a line AB 60. The profile of the blocking pins 34 is limited by the line AB in the tapering region 46. The exemplary embodiments according to the FIGS. 3 to 5 are designed in such a way that the line AB 60 is always within the straight line 48. The line AB 60 can be considered a generator; in the case of a rotary movement about the pin axis 40, the actual form of the jacket of the tapering region 46 is generated. The terms outside and within are in this case used in relation to the position relative to the pin axis 40.

The line AB 60 does not run in a straight line. In the exemplary embodiment according to FIG. 3, it runs on an arc of a circle. The centre point of the arc of a circle lies on a mid-perpendicular to the line segment AB. In the exemplary embodiment according to FIG. 4, the line AB 60 is composed of two sections that are each formed by parts of an arc of a circle. A continuous, but not continuously differentiable spot is produced where the two sections meet. In the exemplary embodiment according to FIG. 5, the line AB is limited by a section of an ellipse. The lines AB according to the FIGS. 3 and 5 are continuously differentiable.

The blocking pins 34 according to FIGS. 1 and 2 that are configured in accordance with the prior art have a transition portion 50 which is located above the tapering region 46 and is part of the shaft region 47. This transition portion 50 has the shape of an axially rather short truncated cone. The transition portion 50 is the consequence of production. It is advantageous to avoid such a transition portion 50. In the embodiment of the blocking pins 34 according to the invention, see FIGS. 3 to 5, such a transition portion 50 in the shaft region 47 is not provided.

It is possible to configure the blocking pin 34 without a front region 42, particularly with an only very short front region 42. In the axial direction, the front region 42 can shrink virtually to a length of more or less zero. In any case, the front end 44 is part of the front region.

Figure 6:
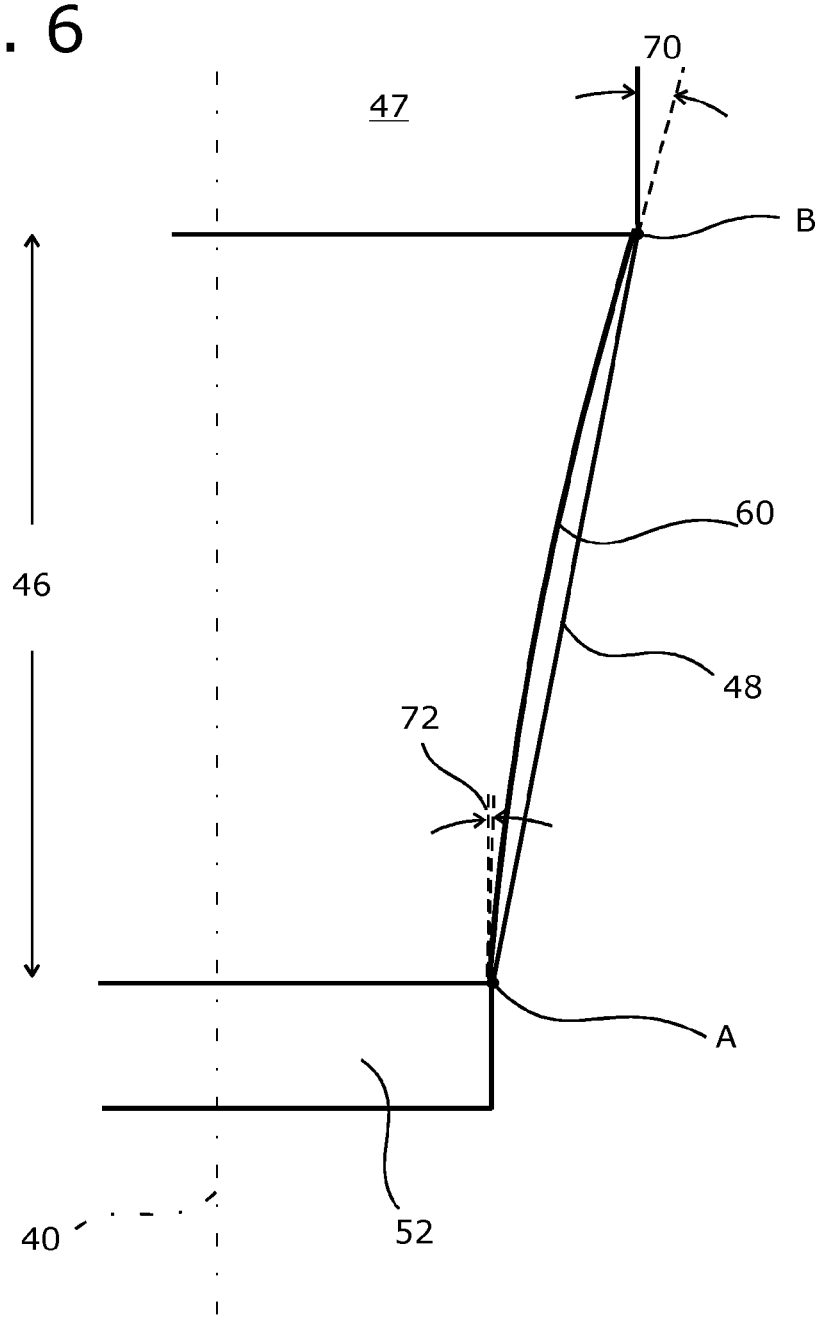
FIG. 6: shows an enlarged view of the right-hand part of a lower section of a blocking pin for explaining the design and for comparison with a blocking pin in accordance with the prior art.

The design is apparent from FIG. 6. In the point A, the line AB 60 includes an angle 72 with a parallel to the pin axis 40. This is the gradient in the point A. In the point B, a tangent to the line AB 60 includes an angle 70 with a parallel to the pin axis 40. This is the angle of gradient at the point B.

The invention claimed is:

1. A locking device of a longitudinal adjustment device of a motor vehicle seat, comprising:
   a latching strip that comprises periodically disposed latching openings and latching webs and is allocated to a floor rail of the longitudinal adjustment device, and
   a blocking unit that is allocated to a seat rail of the longitudinal adjustment device and comprises at least two blocking pins, which can be latched into latching openings independently of one another and unlatched together, and which each have a front region with a front end, a tapering region following the front end and cooperating with the latching webs, and a shaft region that follows the tapering region and has an upper end, the tapering region, seen in profile, tapers from an upper point to a lower point, and which have a pin axis wherein the tapering region is delimited by a line, which connects the upper and lower points and which does not behave in a rectilinear manner, that, seen from the pin axis, the line does not lie outside of a straight line connecting the upper and lower points, and that, see from the pin axis, the line lies within the straight line over at least one third of the line segment between the upper and lower points, wherein the line, at least in its upper third, beginning at the upper point, behaves so as to include an angle greater than 7° with the pin axis.

2. The locking device according to claim 1, wherein the line in the lower point behaves so as to include an angle of less than 5° with the pin axis.

3. The locking device according to claim 1, wherein the line, at least in its upper third, beginning at the upper point, behaves so as to include an angle less than 10° with the pin axis.

4. The locking device according to claim 1, wherein the line comprises at least one rectilinear section and/or at least one curved section.

5. The locking device according to claim 1, wherein the line is continuously differentiable between the upper and lower points.

6. The locking device according to claim 1, wherein gradient of the line has a continuous behavior and decreases starting from the lower point.

7. The locking device according to claim 1, wherein the front end has a cylindrical shoulder.

* * * * *